United States Patent [19]

Conley et al.

[11] Patent Number: 4,511,120
[45] Date of Patent: Apr. 16, 1985

[54] PLASTIC SERVICE VALVE

[75] Inventors: Richard W. Conley; Richard P. Tremblay, both of Pittsburgh; Charles W. Bolam, Canonsburg; James E. Logan, Pittsburgh; David A. Krueger, Harleysville, all of Pa.

[73] Assignee: Kerotest Manufacturing Corp., Pittsburgh, Pa.

[21] Appl. No.: 474,468

[22] Filed: Mar. 11, 1983

[51] Int. Cl.³ ............................................. F16K 51/00
[52] U.S. Cl. ................................. 251/288; 251/312; 251/341; 277/50
[58] Field of Search ............... 251/288, 309, 312, 341; 277/37, 38, 39, 50

[56] References Cited

U.S. PATENT DOCUMENTS

| | | | |
|---|---|---|---|
| 3,089,506 | 5/1963 | Dunbeck | 251/312 |
| 3,254,872 | 6/1966 | Roos | 251/312 |
| 3,260,497 | 7/1966 | Blackford | 251/312 |
| 3,567,177 | 3/1971 | Mueller | 251/288 |
| 3,788,602 | 1/1974 | Kitzie | 251/312 |
| 3,790,132 | 2/1974 | Schmitt | 251/312 |
| 3,970,285 | 7/1976 | Lonn | 251/288 |
| 4,010,930 | 3/1977 | Sands | 251/309 |
| 4,014,512 | 3/1977 | Cheever et al. | 251/309 |
| 4,132,388 | 1/1979 | Billeter | 251/312 |
| 4,348,006 | 9/1982 | Schmitt et al. | 251/288 |

FOREIGN PATENT DOCUMENTS

| | | | |
|---|---|---|---|
| 703515 | 2/1965 | Canada | 251/312 |
| 1038358 | 9/1958 | Fed. Rep. of Germany | 251/312 |

*Primary Examiner*—Martin P. Schwadron
*Assistant Examiner*—Sheri Novack
*Attorney, Agent, or Firm*—Stanley J. Price, Jr.; John M. Adams

[57] ABSTRACT

A valve includes a molded plastic body portion having an internal chamber with upper and lower portions. Fittings connect the valve to conduits of a piping system. A valve seat surrounds inlet and outlet openings in the chamber lower portion. A plastic plug member is rotatably positioned in the valve seat. The plug member is a molded unitary element. The valve body portion and plug member have a substantially uniform wall thickness throughout. The plug member includes an integral plug portion and an actuator portion which facilitates ease of disassembly of the valve for repair. The plug portion has a flow passage which communicates with the inlet and outlet openings in the valve seat and is rotatable between open and closed valve positions. Seals retained on the plug portion engage the valve seat in the closed position. The actuator portion includes shearable stops which permit 360° rotational operation of the plug member upon failure of the stops under excessive torque. The actuator portion extends upwardly through the chamber upper portion, and a flange portion and a stem portion of th actuator extends above the valve body. The flange portion is spaced circumferentially around the stem portion and overlies in abutting relation an upper circumferential shoulder of the valve body portion. The flange portion bears on the upper shoulder so that impact forces applied to the actuator portion are transmitted away from the stem and plug portions and from the flange portion to the valve body portion for distribution throughout the valve body and to the piping system connected to the valve body. This arrangement prevents the localized concentration of impact forces on the valve actuator.

24 Claims, 5 Drawing Figures

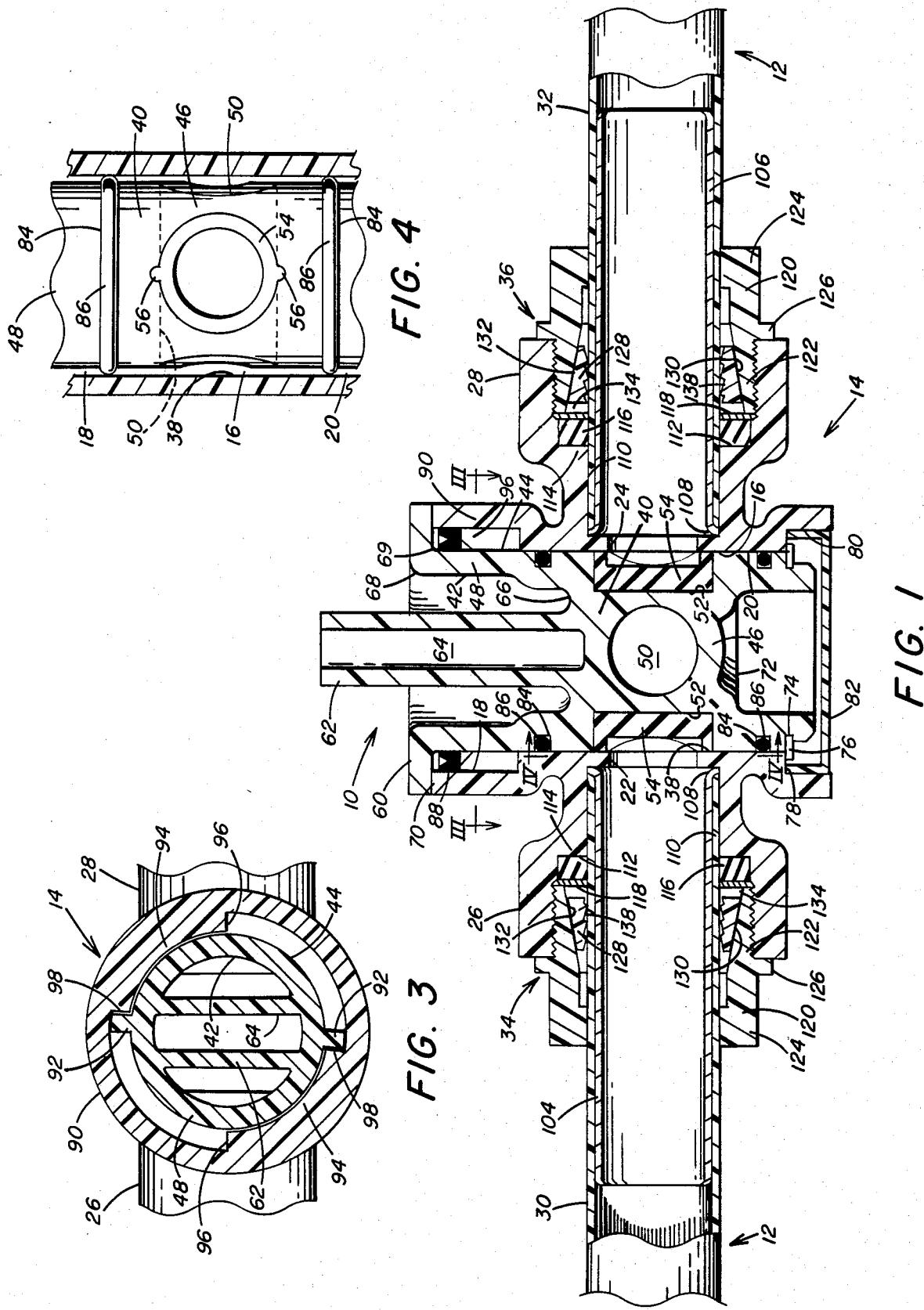

PLASTIC SERVICE VALVE

BACKGROUND OF THE INVENTION

1. Field of the Invention

This invention relates to a service valve and more particularly to a rotary plug-type service valve molded of a high strength plastic material and having a unitary plug and actuator member rotatable in a valve seat of the valve body where the actuator contacts the valve body over a substantial area so that external impact forces applied to the actuator are transmitted to the valve body and not localized on the actuator.

2. Description of the Prior Art

It is well known to fabricate a service valve, such as a ball valve or a plug valve, of molded polyethylene to include a one-piece body having a valve seat with a first passage opening to the seat and a second passage opening to the seat. A rotary member is positioned in the valve seat and a passageway through the rotary member is movable between a closed position where the flow between the first and second passages of the valve body is blocked and an open position where the passage through the rotary member is aligned with the passages in the valve body to permit flow between the first and second passages through the rotary member. The rotary member is provided with seat seals which seal against the wall surrounding the valve body passages to shut off the flow through the passages when the rotary member is turned to the closed position.

It is also known to provide an integral stem and plug arrangement where the stem extends upwardly from the plug and is connected to an adapter for turning the stem. The unitary stem and plug are molded of polyethylene. Because the stem projects upwardly and through the valve body to support the valve actuator, the stem is exposed to external impact blows which are transmitted downwardly through the pressure boundary in the valve to the plug. Accordingly, the stem must have a sufficient cross-sectional area to withstand the impact blows, as well as, withstand the torsional forces transmitted by the valve actuator during operation of the valve.

In view of the fact that polyethylene is a relatively soft and medium-yield material, a polyethylene valve stem must have a thickness substantially greater than the wall thickness of the polyethylene valve body.

It is the conventional practice to fabricate the known polyethylene plug and ball valves by an injection molding process. An integral stem and plug has specific structural requirements that substantially complicate the molding process. Additionally, because polyethylene is a relatively soft plastic material, the valve parts must include relatively thick sections to safely transmit operating forces. These thick valve sections cause the unit cost to increase because increased injection molding machine time is required to allow the thicker sections to cool once the mold is filled with injected plastic. The tooling cost associated with this specialized molding process is high. Consequently, the overall manufacturing time and cost of fabricating a polyethylene service valve mold are high.

An additional problem encountered in the operation of polyethylene service valves is the tendency of the valve body parts to creep or migrate away from one another when subjected to high pressure, particularly when the pressure is applied to the seat seal on one side of the plug without a corresponding supporting pressure on the outer side of the plug. One solution to controlling this migration or creep is reinforcement of the portion of the valve body that surrounds the plug seat seals. By reinforcing the valve body, the normal tendency of the elastomeric material to creep or separate is overcome by rigidifying the valve body.

In one method, the valve body is rigidified by providing an enlarged, integral, external reinforcement ring around the valve body opposite the valve seat. It is also known to provide internal reinforcement rings embedded in a valve body around the valve seat. This reinforced structure is designed to prevent separation or migration of the elastomeric material of the valve body away from the plug member around the valve seat.

The provision of molded, external, as well as, internal reinforcement rings on a valve body requires specialized molding of the valve body to accommodate the reinforcing structure at localized points externally or internally. The molded valve body, therefore, does not have a uniform thickness throughout. The mold for the valve body is considered to be complex because of the need to provide for variations in the wall thickness of the valve body. Such a mold requires complex machine operations to fabricate. Therefore, there is need in a plastic service valve for an integral stem and plug capable of withstanding impact loads directed upon the valve stem, as well as, torsional forces transmitted during operation of the valve and is economically fabricated to resist migration or creep of the plastic material.

SUMMARY OF THE INVENTION

In accordance with the present invention, there is provided a service valve that includes a valve body molded of plastic material and having a chamber with an upper portion and a lower portion. The lower portion has an inlet opening and an outlet opening. A valve seat is provided in the chamber lower portion between the inlet and outlet openings. A valve member is positioned in the valve seat between the inlet and outlet openings. The valve member is molded of plastic material to form a unitary body that includes a plug portion and an actuator portion. The plug portion has a flow passage therethrough. The plug portion is rotatable in the valve seat between an open position where the flow passage is aligned with the inlet and outlet openings to permit fluid flow through the chamber lower portion and a closed position where the flow passage is out of alignment with the inlet and outlet openings to interrupt fluid flow through the chamber lower portion. The actuator extends upwardly through the chamber upper portion and includes a flange portion and a stem portion. The flange portion and the stem portion are connected to the plug portion. The flange portion is spaced circumferentially around the stem portion and extends upwardly between the valve body and the stem portion to a position overlying the valve body and thereby closing the chamber upper portion. The stem projects upwardly from within the flange portion and above the valve body. The valve body includes an upper shoulder extending circumferentially around the chamber upper portion. The flange portion is positioned on the upper shoulder so that impact forces applied to the actuator portion are transmitted away from the stem and plug portions and from the flange portion to the valve body and distributed throughout the valve body.

Preferably, the components of the service valve are fabricated of a plastic material. Most preferably, the plastic material used for molding the service valve body and the plug-actuator member is a thermoplastic material. A thermoplastic material suitable for use in the present invention is marketed by DuPont under the tradename ZYTEL ST801. This material, when used to construct a plastic valve, has the ability to resist migration or creep of plastic material, for example, creep of the plastic valve body away from the plastic plug and, thus, prevent leakage between the plastic valve body and the plastic plug.

Fabricating the service valve from a thermoplastic material, such as ZYTEL, eliminates the need for reinforcing the valve body by external or internal ribs or rings, as encountered with the known valves fabricated of polyethylene. The thermoplastic valve body of the present invention also possesses structural strength capable of withstanding impact blows more efficiently than polyethylene without damage to the valve. It should be understood that thermoplastic materials other than ZYTEL may be used for fabricating the service valve of the present invention.

With the service valve of the present invention, the force of an external impact blow directed either upon the valve stem or the valve actuator is transmitted uniformly throughout the valve body from the flange of the valve member to the upper shoulder of the valve body and through the valve body to the fittings and therefrom through the pipe couplings to the pipeline. Thus, impact forces are transmitted away from the centerline of the valve stem. With this arrangement, the effect of an impact blow is not localized at the valve stem or the valve actuator, but is diverted away from this portion of the valve and directed to the pipeline system. In this manner, fatigue and stress of the valve member attributed to external impact blows and valve leakage or valve failure, which is known to result therefrom, is reduced.

Accordingly, the principal object of the present invention is to provide a plastic service valve having a valve body for rotatably supporting a valve member having an integral plug portion and actuator portion in which the actuator portion and the valve body have a substantial contact area with the valve body for transmitting external impact blows directed upon the actuator away from the plug member and through the valve body to the pipeline system.

Another object of the present invention is to provide a service valve fabricated of an elastomeric material, including components that are substantially uniform in thickness to minimize the expense and time for molding and are resistant to migration of the components away from one another when subjected to substantial internal pressures.

A further object of the present invention is to provide a plastic service valve having a plug portion with a flow passage therethrough and a pair of plug seals securely retained on the surface of the plug and oriented at 90° from the passage to sealingly engage the valve seat and obstruct flow through the valve.

An additional object of the present invention is to provide in a plug valve, an integral plug and actuator portion mounted in a valve body in a manner to permit efficient disassembly of the plug valve.

These and other objects of the present invention will be more completely disclosed and described in the following specification, the accompanying drawings, and the appended claims.

BRIEF DESCRIPTION OF THE DRAWINGS

FIG. 1 is a sectional view in side elevation of a plastic service valve, illustrating the connection of a valve body to a pair of pipes in a pipeline system.

FIG. 3 is a sectional view taken along line III—III of FIG. 1, illustrating the stops on the actuator and valve body for 90° operation of the valve between the open and closed positions.

FIG. 4 is a sectional view taken along line IV—IV of FIG. 1, illustrating one of the two seat seals that are secured to a plug portion of a valve member.

DESCRIPTION OF THE PREFERRED EMBODIMENTS

Figure 5:
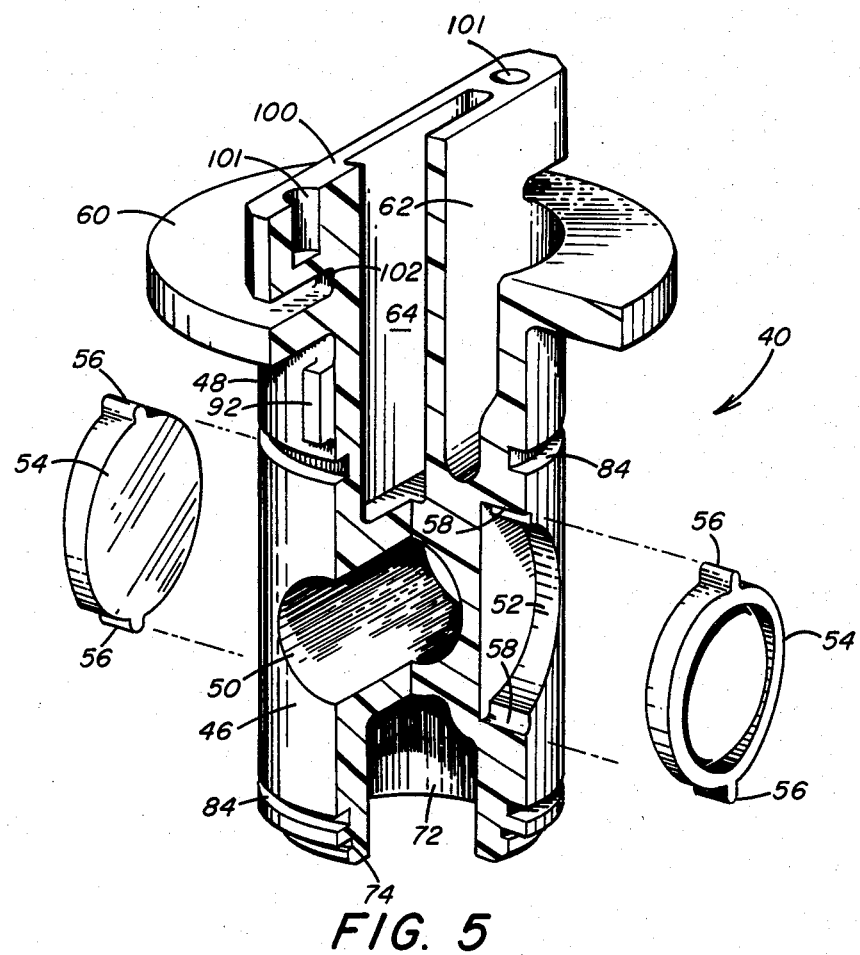
FIG. 5 is an enlarged, exploded, fragmentary, isometric view partially in section of the valve member illustrating an integral plug portion, actuator portion and stem portion and the seat seals that are received within the counterbores of the plug portion.

Referring to the drawings, and particularly to FIG. 1, there is illustrated a service valve generally designated by the numeral 10 of the rotary plug type which is adapted for use as a distribution valve or service stop for controlling the flow of a fluid, either liquid or gas, through a piping system generally designated by the numeral 12. The service valve 10 includes a valve body generally designated by the numeral 14 having a chamber 16 with an upper portion 18 and a lower portion 20. The lower portion 20 has inlet/outlet openings 22 and 24. The valve body 14 also includes conduit or fitting portions 26 and 28 extending from the openings 22 and 24 respectively. The fitting portions 26 and 28 are adapted for connection to a pair of service conduits or pipes 30 and 32 respectively of the piping system 12. The service conduits 30 and 32 are connected to the fitting portions 26 and 28 by compression couplings generally designated by the numeral 34 and 36, which will be described later in greater detail.

The chamber lower portion 20 of the valve body 14 includes a valve seat 38 extending between and around the inlet and outlet openings 22 and 24. A valve member 40 is rotatably positioned in the valve seat 38 between the openings 22 and 24. The valve member 40 is molded of plastic material to form a unitary body of a substantially uniform thickness throughout having an internal surface 42 and an external surface 44. With this configuration, the valve member 40 is efficiently molded, preferably by an injection-molded process, without requiring enlarged body parts having a thickness greater than the other body parts and thereby increasing the complexity of the molding process and costs of machining the mold for the valve member 40.

The valve member 40 includes an integral plug portion 46 and an actuator portion 48. As stated above, the valve member 40 is molded so that both the plug portion 46 and the actuator portion 48 have substantially the same body thickness to provide uniformity of construction throughout the valve member 40. The plug portion 46 has a flow passage 50 therethrough, and is rotatable in the valve seat 38 between an open position and a closed position. In the open position, the flow passage 50 is aligned with the openings 22 and 24 to permit fluid flow therethrough. In the closed position, as shown in FIG. 1, the flow passage 50 is 90° out of alignment with the inlet and outlet openings 22 and 24 to interrupt fluid flow therethrough.

The plug portion 46 is illustrated in greater detail in FIG. 5 and includes a pair of counterbores 52 in the external surface of the plug portion 46. The counterbores 52 are spaced 90° relative to the flow passage 50. Elastomeric inserts 54 are secured in the counterbores 52, as shown in FIGS. 1 and 4, to serve as heat seals for engaging the valve seat 38 around the inlet and outlet openings 22 and 24 when the valve member 40 is in the closed position, as illustrated in FIG. 1. Preferably, the inserts 54 are molded of an elastomeric material, such as Buna N or polyurethane material.

To properly orient and secure the seat seal inserts 54 on the surface of the plug portion 46, the inserts 54 are provided with a pair of oppositely extending keys or tabs 56 shown in FIG. 5 that are received within corresponding keyways 58 of the counterbores 52. The keys 56 have a length corresponding substantially to the keyways 58 so that when the inserts 54 are positioned in the counterbores 52, they are securely and properly oriented on the surface of the plug portion 46 at the location of the counterbores 52. The inserts 54 are slightly oversized in relation to the diameters of the plug counterbores 52. Thus, in order to position the inserts 54 in the counterbores 52, the inserts 54 must be radially compressed. When the inserts 54 are positioned in the counterbores 52, they remain radially compressed. With this arrangement, the outer surfaces of the inserts 54 protrude outwardly from the plug portion 46 to assure that the inserts 54 seal against the wall of the chamber lower portion 20 around the openings 22 and 24.

Preferably, the inserts 54 are formed from an elastomeric material which is molded in the configuration illustrated in FIGS. 1, 4, and 5. The inserts 54 have an outer diameter greater than the diameter of the counterbores 52 to the extent that in order to position the inserts 54 in the counterbores 52, the outer circumferential wall of the inserts 54 must be compressed. Thus, when the inserts 54 are firmly in place in the counterbores 52, the inserts 54 are under compression and securely retained in place. To assure a secure engagement of the inserts 54 in the counterbores 52 of the plug portion 46, the inserts 54 must be radially compressed inwardly to fit in the counterbores 52. Once the inserts 54 are in place in the counterbores 52, the inserts 54 are under compression and, thereby, retained in secure abutting relation with the walls of the plug portion 46 around the counterbores 52. With this arrangement, the inserts 54 are prevented from being displaced from the counterbores 52 when they are moved into and out of sealing relation with the valve body 14 around the openings 22 and 24 which form the valve seat 38.

As illustrated in FIGS. 1 and 5, the valve actuator portion 48 extends upwardly through the valve chamber upper portion 18 to provide an arrangement for closing the valve chamber upper portion 18. The actuator portion 48 is an integral part of the plug portion 46 and includes a flange 60 and a stem 62. The flange 60 is connected to and, thereby, forms an extension of the peripheral surface of the plug portion 46. The stem 62 is also connected to the plug portion 46 and extends centrally and upwardly from the plug portion 46.

The flange 60 is spaced circumferentially around the stem 62. The flange 60 extends upwardly between the valve body 14 and the stem 62 to a position overlying the valve body 14 to, thereby, close the chamber upper portion 18. The stem 62 projects upwardly within the flange 60 and above the valve body 14 to facilitate manipulation of the stem 62 to open and close the service valve 10.

As seen in FIG. 1, the valve member 40 is molded to provide the stem 62 with an internal core 64 surrounded by a wall having a thickness corresponding to the wall thickness of the flange 60. Most preferably, the flange 60 and stem 62 are molded to provide external radial surfaces at a point 66 where the flange 60 and the stem 62 join the plug portion 46 and at points 68 and 69 where the flange 60 overlies the valve body 14. With this arrangement, the flange 60 and stem 62 are integrally formed with a substantially uniform wall thickness throughout. This feature minimizes internal stresses attendant with the molding process that are caused by unequal "shrink" of unequal thicknesses of the plastic as it cools down. The substantially uniform wall, therefore, increases the strength of the flange 60 and stem 62. In addition, the radial surfaces formed at the points 66, 68, and 69 provide the valve member 40 with increased structural strength to resist impact forces applied to the flange 60 and the stem 62. The radial surfaces are operable to distribute impact forces evenly to the flange 60; while, a normally sharp corner at points 66, 68 and 69 would concentrate the impact forces at the sharp corner and produce premature failure.

The valve body 14, as illustrated in FIG. 1, includes an upper shoulder 70 that extends around the chamber upper end portion 18. The upper shoulder 70 forms a circumferential bearing surface for receiving the bottom surface of the flange 60 of the actuator portion 48. This arrangement provides a relatively large flange/body contact area that is operable to absorb substantial impact loads applied to the actuator portion 48 without damaging it or the valve body 14.

By providing a substantial contact area between the flange 60 and the upper shoulder 70 of the valve body 14, when an impact force is applied to the actuator portion 48 it moves downwardly until the flange 60 abuts the shoulder 70, thereby restraining further downward movement of the plug portion 46. The impact forces are transmitted away from the stem 62 and the plug portion 46 through the valve body 14 and the couplings 34 and 36 to the piping system 12. Alternately, the impact forces may be transmitted from the valve body 14 to the valve support (not shown) installed with the service line. This arrangement provides the service valve 10 with an impact resistant structure which is capable of transmitting impact loads directed upon the top of the actuator portion 48 to an area of the valve 10 removed from the vertical center line of the valve member 40 and, in particular, away from the valve member 40 and through the valve body 14 to the conduits 30 and 32.

The ability of the service valve 10 to resist impact forces applied to the upper portion of the valve 10, and, particularly to the flange 60 and the stem 62 is enhanced by the radial surfaces that extend from the horizontal flange portion 60 downwardly to the vertical wall of the actuator portion 48. Thus, the radial surfaces of the flange 60, together with the substantial contact area provided between the flange 60 and the upper shoulder 70 of the valve body 14, permit relatively high impact loads to be applied to the valve 10 without damaging the valve body 14 or the valve member 40.

The service valve 10, including the valve body 14 and the valve member 40 and the coupling therefor, which will be described later, is fabricated of a plastic material by injection molding. Most preferably, the valve body 14, the valve member 40 and the coupling are made from a thermoplastic material known as ZYTEL ST 801 marketed by Dupont. This material is preferred because it possesses high impact resistant properties and when used to fabricate the valve of the present invention provides the valve body 14 and the valve member 40 with substantial, structural rigidity that resists creep or migration of these body parts away from each other, particularly, in the area above and below the seal inserts 54 where the valve body 14 abuts the plug portion 46.

Most preferably, the valve body 14 and the valve member 40 are molded to provide a uniform wall thickness throughout these valve parts. The wall thickness is equal for both the valve body 14 and the valve member 40. This eliminates the need for the valve body 14 to include, for example, a built-up area or a reinforcing ring that extends around the valve body 14 to resist migration or creep of the elastomeric valve body 14 away from the valve member 40.

Referring to FIG. 5, there is illustrated, in greater detail, the features of the valve member 40 and seat seal inserts 54. The valve member 40 has a lower end through which extends a counterbore 72 below the flow passage 50. Surrounding the counterbore on the outer surface of the valve member 40 is an annular groove 74 adapted to receive a snap ring 76 shown in FIG. 1. The snap ring 76 is releasably engageable in the groove 74 with an internal shoulder 78 of the valve body 14 to permit disassembly of the valve 10 without damaging any of the components of the valve 10. The valve body 14, as illustrated in FIG. 1, includes a lower annular recess 80 that surrounds the lower end of the valve member 40. The connection of the valve member 40 to the valve body 14 is sealed by a cover 82, also fabricated of a plastic material, to protect this area of the service valve 10 from tampering, as well as, to protect the internal components of the valve 10 from water and debris entering the valve chamber lower end portion 20.

The cover 82 has a cup-shaped configuration and is releasably insertable into the valve body recess 80 and engageable with the body portion wall surrounding the recess 80. The cover 82 extends to a depth in the recess 80 to abut the shoulder 78. The cover 82 is releasable from engagement with the valve body portion wall surrounding the recess to permit efficient disassembly and removal of the valve member 40 from the valve body 14 for maintenance of the valve or the like.

As illustrated in FIGS. 1, 4, and 5, the plug portion 46 of the valve member 40 includes a pair of circumferential grooves or recesses 84 positioned above and below the flow passage 50. A pair of annular seals 86 having a circular cross section are fabricated of an elastomeric material. The seals 86 are received within the annular grooves 84 and sealingly engage the inner circumferential wall of the valve body 14. The seals 86 provide an effective seal above and below the flow passage 50 to prevent leakage around the plug portion 46 and both upwardly and downwardly through the valve body 14.

As illustrated in FIG. 1, further sealing between the valve member 40 and the valve body 14 is provided by a weather seal ring 88. The seal ring 88 is fabricated of an elastomeric material positioned in surrounding relation with the actuator portion 48 underlying the flange 60 within the valve chamber upper portion 18. Preferably, the weather seal ring 88 is positioned within an enlarged diameter portion 90 of the valve body 14 below the actuator flange 60 and sealingly engages the internal circumferential wall of the valve body enlarged diameter portion 90.

Most preferably, the weather seal ring 88 is a one-way pressure seal ring having a U or V-shaped configuration directed upwardly toward the flange 60, so as to close off the chamber upper end portion 18 below the flange 60. The ring 88 is operable as a one-way pressure seal to prevent water and debris from entering the valve body 14 around the actuator portion 48 and permit the escape of excessive fluid pressure within the valve 10 upwardly and out of the valve 10 between the actuator portion 48 and the valve body 14.

Figure 2:
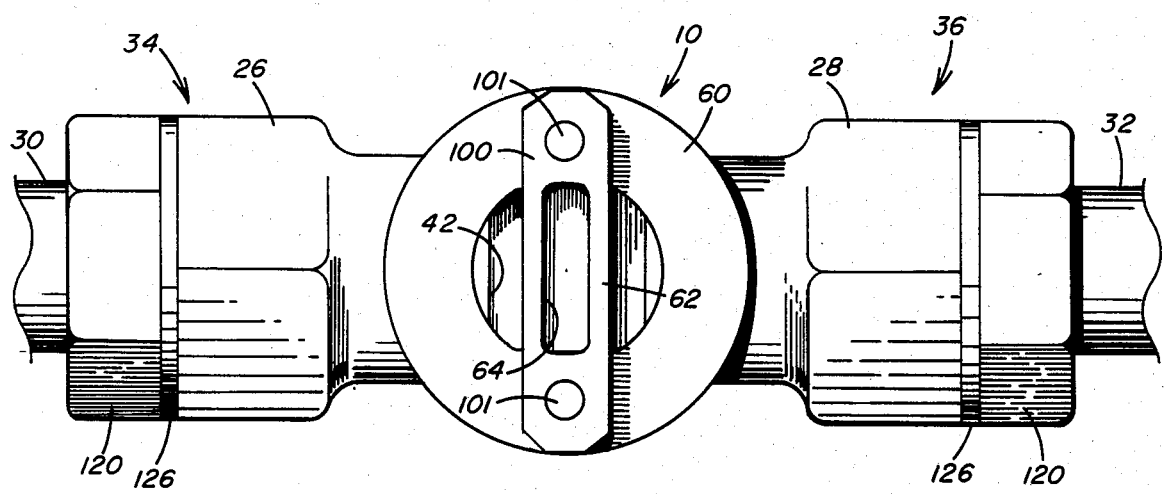
FIG. 2 is a top plan view of the plastic service valve shown in FIG. 1, illustrating an actuator of the valve in a closed position.

Now referring to FIGS. 1, 2, and 3, there is illustrated, in detail, the features of the actuator portion 48 for the valve member 40 to operate between the open and closed positions. Referring particularly to FIG. 3, there is illustrated the valve actuator portion 48 positioned for rotatable movement within the enlarged diameter portion 90 of the valve body 14. The actuator portion 48, as discussed above, is molded to provide a substantially uniform wall thickness throughout the actuator portion 48 and the stem 62 and also to provide the surfaces 42 and 44 with radial inside and outside corners. In this manner, the wall thickness of the actuator portion 48 substantially corresponds to the wall thickness of the stem 62 and, thereby, strengthens these valve member parts.

The actuator portion 48 includes an actuator stop mechanism, shown in FIG. 3, for limiting rotational movement of the valve member 40 between the open and closed positions of the valve. Preferably, the actuator stop mechanism includes a pair of tabs 92, one of which is illustrated in FIG. 5, that extend diametrically outwardly from the circumferential wall of the actuator portion 48 below the flange 60 and above the plug seal groove 84 and below the weather seal 88 within the enlarged cylindrical portion 90 of the valve body 14. Positioned in the portion 90 on the valve body 14 are a pair of stops or lands 94, shown in FIG. 3. The stops 94 project inwardly and extend a preselected circumferential distance around the actuator portion 48. The actuator stops 94 each include shoulders 96 and 98 that are engageable with the tabs 92 of the actuator portion 48. The adjacent pairs of shoulders 96 and 98 are spaced a preselected distance apart to provide for 90° operation of the valve 40 between the open and closed positions.

With the valve member 40 in the closed position, as illustrated in FIGS. 1 and 3, the tabs 92 abut the shoulders 98. To open the valve 10, the stem 62 is rotated in a counterclockwise direction until the tabs 92 engage the shoulders 96. In the event the stem 62 is over-torqued, the tabs 92 will break off from the actuator portion 48 to permit 360° operation of the valve member 40. With this arrangement, even though the stem 62 is over-torqued, the service valve 10 remains in operation without a failure of the pressure boundary between the valve member 40 and the valve body 14.

As a means to indicate the relative position of the valve member 40, i.e. in either the open position or the closed position, the valve stem 62 includes a wing top 100, illustrated in FIGS. 2 and 5. The above-described core 64 of the stem 62 extends upwardly through the wing top 100. In addition, in order to maintain a substantially uniform wall thickness throughout the valve elements, a pair of bores 101 extend downwardly a preselected distance in the wing top 100. The bores 101 are centered in the area between the core 64 and the opposite ends of the wing top 100. The closed ends of the bores 101 are spaced above recesses 102 to achieve the desired uniform wall thickness throughout the valve stem 62.

The wing top 100 has an elongated configuration extending in overlying relation with the flange 60. The wing top 100 is undercut, as illustrated in FIG. 5, above the flange portion 60 to form a recess 102 in the stem 62. The provision of the recess 102 weakens the wing top 100 so that in the event the stem 62 is over-torqued, the wing top 100 will snap off before more extensive damage results to the valve member 40 so that valve member 40 remains operable. This arrangement is comparable to a mechanical fuse and prevents the valve 10 from being removed from service due to the application of excessive torque to the stem 62.

The provision of the wing top 100 also serves as a position indicator for the valve member 40. For example, when the valve member 40 is in the closed position, the wing top 100, as illustrated in FIG. 2, is positioned perpendicular to the direction of flow through the conduits 30 and 32. In the open position of the valve member 40, the wing top 100 is aligned or parallel to the direction of flow through the conduits 30 and 32. This arrangement for indicating the position of the valve member 40 is effective as long as the tabs 92 remain connected to the actuator portion 48.

Now referring to FIG. 1 and the details of the connection of the conduits 30 and 32 to the fitting portions 26 and 28 of the valve body 14, there is illustrated a pair of metallic stiffeners 104 and 106, which are positioned in the ends of the conduits 30 and 32, respectively, in underlying relation with the couplings 34 and 36. The stiffeners 104 and 106 are tubular members each having an outwardly flared end portion 108 that serves to prevent the stiffeners 104 and 106 from being inserted too far into the conduits 30 and 32. The metallic stiffeners 104 and 106 reinforce the plastic conduits 30 and 32 when compressed by the engagement of the couplings 34 and 36 on the valve body fitting portions 26 and 28.

Each of the fitting portions 26 and 28 includes a bore 110 for receiving the conduits 30 and 32. A recess 112 formed in the body of each fitting portion 26 and 28 surrounds the bore 110 to form an internal shoulder 114. An elastic deformable member, such as a Buna-N gasket 116 is positioned in the recess 112 in abutting relation with the internal shoulder 114. A washer 118, which may be fabricated from either plastic or metal, overlies the gasket 116 in the recess 112. A plastic nut 120, also fabricated of the same material used to mold the valve body 14 and the valve member 40, is threadedly connected to each fitting portion 26 and 28. Preferably, the fittings 26 and 28 are internally threaded, and the nuts 120 are externally threaded. The nuts 120 are threadedly advanced into the respective internally threaded ends of the bores of the fittings 26 and 28.

As seen in FIG. 1, each nut 120 has a first externally threaded end portion 122 and, preferably, a hexagonal second end portion 124 separated from the threaded end portion 122 by a circumferentially extending shoulder 126. With this arrangement, the nut 120 is threadedly advanced into the fitting threaded bore until the shoulder 126 abuts the end of the respective fitting to limit the axial advancement of the nut 120 into the fitting. When the nut 120 is in this position, the nut end portion 122 directly applies a compressive force through the washer 118 upon the gasket 116 to compress the gasket 116 into sealing relation around the respective conduit and with the body of the fitting around the shoulder 114.

By limiting the advancement of the nut 120 into the fitting bore 110 by abutment of the shoulder 126 with the end of the fitting, the gasket 116 is compressed by the end of the nut and the degree of compression of the gasket 116 is controlled. In this manner, excessive compression and damage of the gasket 116 is prevented. Accordingly, the dimensional length of the nut threaded portion 122 from the shoulder 126 to the end of the nut 120 is selected to provide advancement of the nut 120 to a preselected stop point in the respective fittings 26 and 28. When the shoulder 126 abuts the end of the fitting, the end of the nut 120 is positioned at the stop point. At the stop point, the nut applies a preselected compressive force upon the gasket 116 to form a positive seal around the respective conduit between the conduit and the fitting body portion.

The nut 120 is operable to directly apply a compressive force through the washer 118 upon the gasket 116. Thus, the gasket 116 is urged into sealing relation with the outer surface of the respective conduit and the inner surface of the respective fitting around the recess 112. Control of the degree of advancement of the nut into the fitting assures positive sealing engagement of the gasket 116 with the respective conduits and fittings to form an effective fluid tight seal therearound.

A further feature of the couplings 34 and 36 is the positioning of pipe-gripping collars 128 between the nuts 120 and the respective conduits 30 and 32. Each pipe-gripping collar 128 has an external wedge surface 130 complementary and cooperating with an internal wedge surface 132 of the nut 120. The collar 128 is positioned in a bore 134 of the nut 120 surrounding the respective conduit. When the nut 120 is advanced to the stop point in the respective fitting where the shoulder 126 abuts the end of the fitting, the enlarged end of the collar 128 is spaced from the washer 118, as shown in FIG. 1. Thus, it is not necessary for the collar 128 to be forced into abutting relation with the washer 118 in order to compress the gasket 116. The end of the nut 120 applies the force to compress the gasket 116 and not the collar 128.

As the nut 120 is threadedly advanced upon rotation into the threaded end of the respective fitting, the nut internal wedge surface 132 rides up the collar external wedge surface 130. This urges the collar 128 into frictional engagement with the respective conduit. The nut 120 is rotated until the shoulder 126 abuts the end of the fitting, and a preselected wedging force is applied by the nut 120 to the collar 128.

The frictional engagement of the collar 128 with the respective conduit is enhanced by the provision of an internal roughened surface, as by serrations 138, on the collar 128. Thus, the nut 120 is advanced a preselected distance into the fitting to, not only effect a seal around the respective conduit by compression of the gasket 116, but also to firmly engage the collar 128 with the conduit. In this manner, the conduits 30 and 32 are sealingly connected to the valve assembly 10. A fluid tight seal is formed around the conduits 30 and 32 within the fittings and against the body of the fittings 28 and 30 within the fittings 28 and 30.

According to the provisions of the patent statutes, we have explained the principle, preferred construction and mode of operation of our invention and have illustrated and described what we now consider to represent its best embodiment. However, it should be understood, that, within the scope of the appended claims, the invention may be practiced otherwise than as specifically illustrated and described.

We claim:

1. A service valve comprising, a valve body molded of plastic material and having a chamber with an upper portion and a lower portion, said lower portion having an inlet opening and an outlet opening, a valve seat in said chamber lower portion between said inlet and outlet openings, a valve member positioned in said valve seat between said inlet and outlet openings, said valve member being molded of plastic material to form a unitary body including a plug portion and an actuator portion, said plug portion having a flow passage therethrough, said plug portion being rotatable in said valve seat between an open position where said flow passage is aligned with said inlet and outlet openings and a closed position where said flow passage is out of alignment with said inlet and outlet openings to control the flow of fluid through said chamber lower portion, said actuator portion extending upwardly from said plug portion through said chamber upper portion, said actuator portion including a flange and a stem, said flange and said stem being integral with said plug portion to form said valve member unitary body, said flange being spaced circumferentially around said stem and including a first portion extending upwardly between said valve body and said stem and a second portion positioned in overlying relation with said valve body and thereby closing said chamber upper portion, said stem projecting upwardly from within said flange and above said valve body, said valve body including an upper shoulder forming a bearing surface extending circumferentially around said chamber upper portion for receiving said flange second portion, and said flange second portion being positioned on said upper shoulder to support said actuator portion on said valve body so that impact forces applied to said actuator portion are transmitted from said flange to said valve body bearing surface and distributed throughout said valve body away from said stem and said plug.

2. A service valve as set forth in claim 1, in which, said valve body includes an enlarged upper end portion surrounding said chamber upper portion, said actuator portion extending upwardly through said valve body enlarged upper end portion and spaced therefrom to form an annular space between said valve body enlarged upper end portion and said actuator portion, and seal means positioned in said annular space for sealingly engaging said valve body enlarged upper end portion and said actuator portion to prevent moisture and debris from entering said chamber while allowing excess fluid pressure to escape from said chamber and out of said valve body.

3. A service valve as set forth in claim 2 which includes, said flange extending over said annular space and onto said upper shoulder, and said seal means being positioned under and thereby protected by said flange to prevent impact forces applied to said actuator from disturbing said seal means.

4. A service valve as set forth in claim 1, in which, said flange, stem, and plug portion are connected to one another to form said valve member as a molded, integral body, and said molded, integral body having a preselected wall thickness such that the wall thickness remains substantially uniform throughout said flange, stem, and plug portion.

5. A service valve as set forth in claim 4 in which, said molded, integral body of said valve member has an external surface and an internal surface, said external and internal surfaces conforming to one another to achieve said preselected wall thickness uniformly throughout said molded, integral body, said flange second portion forming a horizontal wall of a thickness substantially corresponding to the thickness of a wall of said plug portion, said valve body having a uniform wall thickness throughout corresponding to the uniform wall thickness of said valve member, and said flange horizontal wall overlying said valve body to provide a contact area between said flange horizontal wall and said valve body upper shoulder for absorbing impact loads applied to said valve body without damaging said valve body or said valve member.

6. A service valve as set forth in claim 1 in which, said stem has an enlarged upper end portion, said stem enlarged upper end portion having an elongated configuration overlying said flange, and said stem enlarged upper end portion being undercut to form a recess in the body of said stem to weaken said stem such that in the event that torque exceeding a preselected amount is applied to said stem said enlarged upper end portion breaks before the remaining portion of said valve member is damaged.

7. A service valve as set forth in claim 6 in which, said stem enlarged upper end portion includes position indicator means for indicating the relative position of said valve member between said open and closed positions, and said position indicator means including a wing top positioned perpendicular to the direction of flow through said chamber when said plug portion is in said closed position and positioned parallel to the direction of flow through said chamber when said plug portion is in said open position.

8. A service valve as set forth in claim 1, in which, said actuator portion includes actuator stop means for limiting said valve member to 90° rotation between said open and closed positions, said actuator stop means including a tab extending outwardly from said actuator portion below said flange, and said valve body including a pair of stop shoulders spaced a preselected radial distance apart on said valve body within said chamber upper portion and engageable with said tab upon rotation of said valve member to limit said valve member to 90° rotational movement between said open and closed positions.

9. A service valve as set forth in claim 8 in which, said tab is shearable from said actuator portion in the event that torque exceeding a preselected amount is applied to said stem so that said valve member is free to rotate through 360° and remain operational to open and close said inlet and outlet openings.

10. A service valve as set forth in claim 1 in which,
said plug portion includes a pair of counterbores in the external surface thereof,
said counterbores being spaced oppositely of one another and positioned 90° relative to said flow passage,
each of said counterbores including a pair of keyways,
a pair of seal inserts positioned in said pair of counterbores respectively, and
each of said seal inserts including a pair of keys received within said pair of keyways of said respective pair of counterbores and said seal inserts being retained in a compressed state within said counterbores to securely retain said seal inserts in a preselected orientation in said counterbores.

11. A service valve as set forth in claim 10 in which,
said seal inserts are molded of an elastomeric material and have a preselected configuration so that said seal inserts are compressed when positioned in said counterbores of said plug portion to sealingly engage said valve seat around said inlet and outlet openings when said plug portion is in said closed position.

12. A service valve comprising,
a valve body molded of plastic material and having a chamber with an upper portion and a lower portion,
said valve body having a uniform body thickness throughout,
said lower portion having an inlet opening and an outlet opening,
a valve seat in said chamber lower portion between said inlet and outlet openings,
a valve member positioned in said valve seat between said inlet and outlet openings,
said valve member being molded of plastic material and including a unitary body having internal and external surfaces forming a uniform body thickness throughout whereby the body thickness of said valve member substantially corresponds to the body thickness of said valve body,
said unitary body including a plug portion and an actuator portion integrally molded to form a single element,
said plug portion having a flow passage therethrough,
said plug portion being rotatable in said valve seat between an open position where said flow passage is aligned with said inlet and outlet openings and closed position where said flow passage is out of alignment with said inlet and outlet openings to control the flow of fluid through said chamber lower portion,
said actuator portion extending upwardly from said plug portion through said chamber upper portion,
said actuator portion including a flange and a stem,
said flange and said stem being integral with said plug portion,
said flange extending upwardly from plug portion to a position overlying said valve body and closing said chamber upper portion,
said stem projecting centrally and upwardly from said plug portion to a position above said flange,
said flange extending circumferentially in spaced relation around said stem to form an annular space between said stem and said flange to provide access to said stem to rotate said stem between said open and closed positions, and
said stem having an internal core extending downwardly through said stem to a point where said stem joins said plug portion to provide said stem with a body thickness corresponding to the body thickness of said flange.

13. A service valve as set forth in claim 12 in which,
said stem has an upper end portion extending a preselected distance above said flange,
said stem including an integrally molded elongated portion overlying said flange in spaced relation above said flange,
said elongated portion being adapted to receive a turning force for rotating said plug portion between said open and closed positions, and
said integrally molded elongated portion being oriented relative to said plug portion such that said elongated portion is positioned perpendicular to the direction of flow through said chamber when said plug portion is in said closed position and is positioned parallel to the direction of flow through said chamber when said plug portion is in said open position.

14. A service valve as set forth in claim 13 in which,
said stem elongated portion is undercut to form a recess in said stem above said flange to weaken the strength of said stem so that in the event a torque exceeding a preselected amount is applied to said stem said elongated portion beaks off from said stem before the remaining portions of said valve member are damaged.

15. A service valve as set forth in claim 13 in which,
said stem upper end portion includes a central opening extending through said elongated portion and communicating with said stem internal core, and
a plurality of bores spaced from said central opening and extending downwardly a selected distance into said stem elongated portion to provide said stem with a uniform body thickness throughout corresponding to the thickness of the body of said flange.

16. A service valve as set forth in claim 12, in which,
said actuator portion includes actuator stop means for limiting rotation of said plug portion in said valve seat between said open and closed positions,
said actuator stop means including a shearable tab extending outwardly from said actuator portion and positioned between said flange and said plug portion,
said valve body including a pair of stop shoulders spaced a preselected circumferential distance apart on said valve body within said chamber upper portion, and
said stop shoulders being engageable with said tab upon rotation of said stem to limit rotation of said plug portion between said open and closed positions.

17. A service valve comprising,
a valve body molded of plastic material and having a chamber with an upper portion and a lower portion, said lower portion having an inlet opening and an outlet opening, a valve seat in said chamber lower portion between said inlet and outlet openings, a valve member positioned in said valve seat between said inlet and oulet openings, said valve member including a plug portion and an actuator portion, said plug portion having a flow passage therethrough, said plug portion being rotatable in said valve seat between an open position where said flow passage is aligned with said inlet and outlet openings and a closed position where said flow passage is out of alignment with said inlet and outlet openings to control the flow of fluid through said chamber lower portion, said actuator portion extending upwardly from said valve body, said plug portion including a pair of counterbores in the external surface thereof, said counterbores being spaced oppositely of one another and positioned 90° relative to said flow passage, said counterbores each having a preselected diameter a pair of elastomeric seal inserts, each of said seal inserts having a compressible outer circumferential wall, and having an outer diameter greater than said diameter of said respective counterbores said seal inserts being radially compressed inwardly within said pair of counterbores respectively to place said seal inserts under compression in said counterbores to sealingly engage said seal inserts within said counterbores on the external surface of said plug portion, means for maintaining said seal inserts fixed in a preselected rotational orientation in said counterbores of said plug portion, said plug portion having an outer cylindrical surface, and said seal inserts having an arcuate sealing surface protruding outwardly from said cylindrical surface of said plug portion to provide an interference fit with said valve seat so that when said plug portion is in said closed position said seal inserts sealingly engage said valve seat around said inlet and outlet openings.

18. A service valve as set forth in claim 17 in which, said means for maintaining said seal inserts fixed includes each of said pair of counterbores having a pair of keyways extending from the periphery of said counterbores in said plug portion, each of said seal inserts including a pair of keys extending from said seal inserts respectively, and said keys being positioned on said seal inserts so as to be received within said keyways respectively when said seal inserts are positioned in said counterbores to thereby assure secure engagement of said seal inserts in a preselected position in said counterbores.

19. A service valve comprising, a valve body molded of plastic material and having a chamber with an upper portion and a lower portion, said lower portion having an inlet opening and an oulet opening, a valve seat in said chamber lower portion between said inlet and outlet openings, a valve member positioned in said valve seat between said inlet and outlet openings, said valve member being molded of plastic material to form a unitary body including a plug portion and an actuator portion, said plug portion having a flow passage therethrough, said plug portion being rotatable in said valve seat between an open position where said flow passage is aligned with said inlet and outlet openings and a closed position where said flow passage is out of alignment with said inlet and outlet openings to control the flow of fluid through said chamber lower portion, said actuator portion extending upwardly through said chamber upper portion and including a flange and a stem, said stem having an enlarged upper end portion, said stem enlarged upper end portion having an elongated configuration overlying said flange, said stem enlarged upper end portion being undercut to form a recess in the body of said stem to weaken said stem such that in the event that torque exceeding a preselected amount is applied to said stem said enlarged upper end portion breaks before the remaining portion of said valve member is damaged, said flange and said stem being connected to said plug portion, said flange being spaced circumferentially around said stem and extending upwardly between said valve body and said stem to a position overlying said valve body and thereby closing said chamber upper portion, said stem projecting upwardly from within said flange and above said valve body, said valve body including an upper shoulder extending circumferentially around said chamber upper portion, and said flange being positioned on said upper shoulder so that impact forces applied to said actuator portion are transmitted away from said stem and plug and from said flange to said valve body and distributed throughout said valve body.

20. A service valve comprising, a valve body molded of plastic material and having a chamber with an upper portion and a lower portion, said lower portion having an inlet opening and an outlet opening, a valve seat in said chamber lower portion between said inlet and outlet openings, a valve member positioned in said valve seat between said inlet and outlet openings, said valve member being molded of plastic material to form a unitary body including a plug portion and an actuator portion, said plug portion having a flow passage therethrough, said plug portion being rotatable in said valve seat between an open position where said flow passage is aligned with said inlet and outlet openings and a closed position where said flow passage is out of alignment with said inlet and outlet openings to control the flow of fluid through said chamber lower portion, said actuator portion extending upwardly through said chamber upper portion and including a flange and a stem, said stem having an enlarged upper end portion,
said stem enlarged upper end portion including position indicator means for indicating the relative position of said valve member between said open and closed position,
said position indicator means including a wing top positioned perpendicular to the direction of flow through said chamber when said plug portion is in said closed position and positioned parallel to the directional flow through said chamber when said plug portion is in said open position,
said flange and said stem being connected to said plug portion,
said flange being spaced circumferentially around said stem and extending upwardly between said valve body and said stem to a position overlying said valve body and thereby closing said chamber upper portion,
said stem projecting upwardly from within said flange and above said valve body,
said valve body including an upper shoulder extending circumferentially around said chamber upper portion, and
said flange being positioned on said upper shoulder so that impact forces applied to said actuator portion are transmitted away from said stem and plug and from said flange to said valve body and distributed throughout said valve body.

21. A service valve comprising,
a valve body molded of plastic material and having a chamber with an upper portion and a lower portion,
said lower portion having an inlet opening and an outlet opening,
a valve seat in said chamber lower portion between said inlet and outlet openings,
a valve member positioned in said valve seat between said inlet and outlet openings,
said valve member being molded of plastic material to form a unitary body including a plug portion and an actuator portion,
said plug portion having a flow passage therethrough,
said plug portion being rotatable in said valve seat between an open position where said flow passage is aligned with said inlet and outlet openings and a closed position where said flow passage is out of alignment with said inlet and outlet openings to control the flow of fluid through said chamber lower portion,
said plug portion including a pair of counterbores in the external surface thereof,
said counterbores being spaced oppositely of one another and positioned 90° relative to said flow passage,
each of said counterbores including a pair of keyways,
a pair of seal inserts positioned in said pair of counterbores respectively,
each of said seal inserts including a pair of keys received within said pair of keyways of said respective pair of counterbores and said seal inserts being retained in a compressed state within said counterbores to securely retain said inserts in a preselected orientation in said counterbores,
said actuator portion extending upwardly through said chamber upper portion and including a flange and a stem,
said flange and said stem being connected to said plug portion,
said flange being spaced circumferentially around said stem and extending upwardly between said valve body and said stem to a position overlying said valve body and thereby closing said chamber upper portion,
said stem projecting upwardly from within said flange and above said valve body,
said valve body including an upper shoulder extending circumferentially around said chamber upper portion, and
said flange being positioned on said upper shoulder so that impact forces applied to said actuator portion are transmitted away from said stem and plug and from said flange to said valve body and distributed throughout said valve body.

22. A service valve comprising,
a valve body molded of plastic material and having a chamber with an upper portion and a lower portion,
said valve body having a uniform body thickness throughout,
said lower portion having an inlet opening and an outlet opening,
a valve seat in said chamber lower portion between said inlet and outlet openings,
a valve member positioned in said valve seat between said inlet and outlet openings,
said valve member being molded of plastic material and including a unitary body having internal and external surfaces forming a uniform body thickness throughout whereby the body thickness of said valve member substantially corresponds to the body thickness of said valve body,
said unitary body including a plug portion and an actuator portion integrally molded to form a single element,
said plug portion having a flow passage therethrough,
said plug portion being rotatable in said valve seat between an open position where said flow passage is aligned with said inlet and outlet openings and a closed position where said flow passage is out of alignment with said inlet and outlet openings to control the flow of fluid through said chamber lower portion,
said actuator portion extending upwardly through said chamber upper portion and including a flange and a stem,
said flange and said stem being integrally connected to said plug portion,
said stem having an upper end portion extending a preselected distance above said flange,
said stem including an integrally molded elongated portion overlying said flange in spaced relation above said flange,
said elongated portion being adapted to receive a turning force for rotating said plug portion between said open and closed positions,
said integrally molded elongated portion being oriented relative to said plug portion such that said elongated portion is positioned perpendicular to the direction of flow through said chamber when said plug portion is in said closed position and is positioned parallel to the direction of flow through said chamber when said plug portion is in said open position, said stem elongated portion being undercut to form a recess in said stem above said flange to weaken the strength of said stem so that in the event a torque exceeding a preselected amount is applied to said stem said elongated portion breaks off from said stem before the remaining portions of said valve member are damaged, said flange extending upwardly from said plug portion to a position overlying said valve body and closing said chamber upper portion, said stem projecting upwardly from said plug portion and through said flange to a position above said flange, said flange extending circumferentially in spaced relation around said stem to form an annular space between said stem and said flange to provide access to said stem to rotate said stem between said open and closed positions, and said stem having an internal core extending downwardly through said stem to a point where said stem joins said plug portion to provide said stem with a body thickness corresponding to the body thickness of said flange.

23. A service valve comprising, a valve body molded of plastic material and having a chamber with an upper portion and a lower portion, said valve body having a uniform body thickness throughout, said lower portion having an inlet opening and an outlet opening, a valve seat in said chamber lower portion between said inlet and outlet openings, a valve member positioned in said valve seat between said inlet and outlet openings, said valve member being molded of plastic material and including a unitary body having internal and external surfaces forming a uniform body thickness throughout whereby the body thickness of said valve member substantially corresponds to the body thickness of said valve body, said unitary body including a plug portion and an actuator portion integrally molded to form a single element, said plug portion having a flow passage therethrough, said plug portion being rotatable in said valve seat between an open position where said flow passage is aligned with said inlet and outlet openings and a closed position where said flow passage is out of alignment with said inlet and outlet openings to control the flow of fluid through said chamber lower portion, said actuator portion extending upwardly through said chamber upper portion and including a flange and a stem, said flange and said stem being integrally connected to said plug portion, said stem having an upper end portion extending a preselected distance above said flange, said stem including an integrally molded elongated portion overlying said flange in spaced relation above said flange, said elongated portion being adapted to receive a turning force for rotating said plug portion between said open and closed positions, said integrally molded elongated portion being oriented relative to said plug portion such that said elongated portion is positioned perpendicular to the direction of flow through said chamber when said plug portion is in said closed position and is positioned parallel to the direction of flow through said chamber when said plug portion is in said open position, said stem upper end portion including a central opening extending through said elongated portion and communicating with said stem internal core, a plurality of bores spaced from said central opening and extending downwardly a selected distance into said stem elongated portion to provide said stem with a uniform body thickness throughout corresponding to the thickness of the body of said flange, said flange extending upwardly from said plug portion to a position overlying said valve body and closing said chamber upper portion, said stem projecting upwardly from said plug portion and through said flange to a position above said flange, said flange extending circumferentially in spaced relation around said stem to form an annular space between said stem and said flange to provide access to said stem to rotate said stem between said open and closed positions, and said stem having an internal core extending downwardly through said stem to a point where said stem joins said plug portion to provide said stem with a body thickness corresponding to the body thickness of said flange.

24. A service valve comprising, a valve body molded of plastic material and having a chamber with an upper portion and a lower portion, said lower portion having an inlet opening and an outlet opening, a valve seat in said chamber lower portion between said inlet and outlet openings, a valve member positioned in said valve seat between said inlet and outlet openings, said valve member including a plug portion and an actuator portion, said plug portion having a flow passage therethrough, said plug portion being rotatable in said valve seat between an open position where said flow passage is aligned with said inlet and outlet openings and a closed position where said flow passage is out of alignment with said inlet and outlet openings to control the flow of fluid through said chamber lower portion, said actuator portion extending upwardly from said valve body, said plug portion including a pair of counterbores in the external surface thereof, said counterbores being spaced oppositely of one another and positioned 90° relative to said flow passage, a pair of elastomeric seal inserts positioned in said pair of counterbores respectively, each of said pair of counterbores having a pair of keyways extending from the periphery of said counterbores in said plug portion, each of said seal inserts including a pair of keys extending from said seal inserts respectively, said keys being positioned on said seal inserts so as to be received within in said keyways respectively when said seal inserts are positioned in said counterbores to thereby assure secure engagement of said seal inserts in a preselected position in said counterbores, said plug portion having and outer cylindrical surface, and said seal inserts having an arcuate sealing surface protruding outwardly from said cylindrical surface of said plug portion to provide an interference fit with said valve seat so that when said plug portion is in said closed position said seal inserts sealingly engage said valve seat around said inlet and outlet openings.

* * * * *